(12) United States Patent
McMorris (10) Patent No.: US 7,681,715 B2
(45) Date of Patent: Mar. 23, 2010

(54) METHOD AND APPARATUS FOR DISCHARGING MATERIAL AT SPACED INTERVALS

(76) Inventor: Dennis L. McMorris, Box 188, Balcarres, SK (CA) S0G 0C0

( * ) Notice: Subject to any disclaimer, the term of this patent is extended or adjusted under 35 U.S.C. 154(b) by 179 days.

(21) Appl. No.: 11/682,030

(22) Filed: Mar. 5, 2007

(65) Prior Publication Data

US 2007/0209908 A1    Sep. 13, 2007

(30) Foreign Application Priority Data

Mar. 8, 2006    (CA) .................................. 2539928

(51) Int. Cl.
  B65G 33/00    (2006.01)
  B65G 33/12    (2006.01)
  B65G 33/26    (2006.01)
  B65G 33/34    (2006.01)
(52) U.S. Cl. ................. 198/657; 198/658; 198/662; 198/670; 198/671; 198/675; 198/676
(58) Field of Classification Search .................. 198/69, 198/618–620, 657, 658, 670–671
See application file for complete search history.

(56) References Cited

U.S. PATENT DOCUMENTS

| 2,630,905 | A | * | 3/1953 | Howe | 198/311 |
| 3,031,064 | A | * | 4/1962 | Kline | 198/359 |
| 3,722,715 | A | * | 3/1973 | Young | 414/292 |
| 5,709,296 | A | * | 1/1998 | Forsberg | 198/658 |
| 6,722,491 | B2 | * | 4/2004 | Forsberg | 198/658 |
| 2002/0043448 | A1 | * | 4/2002 | Peltier et al. | 198/618 |

* cited by examiner

Primary Examiner—Gene Crawford
Assistant Examiner—Yolanda Cumbess
(74) Attorney, Agent, or Firm—Ade & Company Inc.; Ryan W. Dupuis; Kyle R. Satterthwaite (57) ABSTRACT

A method and apparatus for discharging material at spaced intervals each provide a conveying tube and a conveying mechanism for moving material from a first end of the tube toward a second opposite end. Discharge openings are provided spaced along the tube at different heights thereon. Openings near the first end are at a higher elevation on the tube than those near the second end, corresponding to downward slope of material upon initial entry and conveyance within the tube. The decreasing elevation of discharge openings and corresponding slope of material act to delay discharge near the first end, by requiring a build up of material height to reach the opening, and hasten discharge near the second end, by eliminating the need to fill drop tubes or metering devices before conveying material further along the tube. This reduces lag time between progressive discharge openings thereby providing more even material distribution therefrom.

8 Claims, 5 Drawing Sheets

METHOD AND APPARATUS FOR DISCHARGING MATERIAL AT SPACED INTERVALS

This application claims foreign priority benefits from Canadian Patent Application 2,539,928, filed Mar. 8, 2006.

FIELD OF THE INVENTION

This invention relates to a method and apparatus for discharging material at spaced intervals, and more particularly for distributing material evenly among such spaced intervals.

BACKGROUND OF THE INVENTION

Systems in which material is conveyed through an elongate tubular passage for discharge therefrom at distances thereal­ong are known, for example, for distributing food to a number of animal feeding stations along the tube.

U.S. Pat. Nos. 2,914,023 to St. Pierre, 3,504,654 to Geer­lings et al., 3,990,402 to Eriksson, 4,337,728 to Van Gilst et al., 4,513,687 to De Jong, 4,495,895 to Reeder and 4,722,301 to Strong all disclose feeding systems in which vertical drop tubes are disposed at spaced intervals along a conveying path to discharge food material therefrom to respective feeding stations. In such an arrangement, it should be appreciated that material being conveyed along the path falls into the first drop tube until it becomes filled. Only once this first drop tube nearest the food source is filled does the next drop tube inline being to receive food from the conveying path. While the volume of a drop tube can be used to meter the amount of material to be distributed at each feeding station, the sequen­tial filling of the drop tubes can result in a significant wait between delivery of material to the first and last drop tubes of the system. Facilitating simultaneous delivery of food mate­rial to the feeding stations therefore requires closing off the drop tubes until they are all substantially filled, at which point their contents can be released.

As a result, there is a desire for a way to provide relatively quick and even discharge of material from a conveying pas­sage at spaced intervals therealong.

SUMMARY OF THE INVENTION

According to a first aspect of the invention there is provided a method for discharging material at spaced intervals, said method comprising the steps of:

supporting an elongate conveying tube to define a path along which material can travel;

providing a conveying mechanism to move material along the conveying tube;

providing discharge elements spaced along the conveying tube, each discharge element comprising a discharge opening through which material can be discharged from said convey­ing tube, at least one discharge opening proximate a first end of the conveying tube being greater in elevation relative to said conveying tube than at least one discharge opening proxi­mate a second end of said conveying tube opposite the first end; and evenly distributing material among the discharge elements for substantially unrestricted discharge from the conveying tube by operating the conveying mechanism.

The present invention provides faster delivery to every discharge element than the prior art by providing the dis­charge openings from the interior of the conveying tube at heights corresponding to their positions along the tube. Mate­rial is conveyed from a first end of the tube toward a second end opposite the first. Discharge openings near the first end of the tube are located higher on the tube than openings at the second end. The material, which slopes downward from the first end upon entry to the tube, gradually increases in height as more material is conveyed. Unlike with the drop tubes of the prior art, the material is not restricted as it exits the conveying tube. Instead, it is the height distribution of the discharge openings that determines when material within the tube reaches a particular discharge opening, rather than the time needed to fill preceding drop tubes. As a result, material is distributed along the length of the tube much more quickly, reducing the lag between discharge from the first end and that from the second end.

By substantially reducing the time between initial material discharge at opposite ends of the conveying tube, the present invention ensures that substantially similar amounts of mate­rial are discharged at the elements spaced along the tube. This eliminates the closable drop tubes or other metering means at each discharge point. The system thus offers a simplified system requiring less building material and less user or con­trol system actuation of moving components.

There may be provided the additional step of adjusting the elevation of at least one discharge opening relative to the conveying tube.

There may be provided the additional step of adjusting the size of at least one discharge opening. For example, increas­ing the size of discharge openings near the second end will increase the rate of material discharge therethrough, which will compensate for lack of discharge during the lag time from the initial discharge near the first end and further encour­age even distribution of discharged material along the con­veying tube.

There may be provided the additional step of aligning the discharge elements with respective receiving stations dis­posed beneath the conveying tube.

Preferably the conveyer tube is cylindrical and the convey­ing mechanism comprises an auger operably disposed within said conveyer tube.

The conveying tube may comprise longitudinal sections connected inline, each section having at least one discharge element and being independently rotatable about a longitudi­nal axis of the conveying tube.

Each discharge element may further comprise:

a movable blocker member supported on the conveying tube;

a tube opening in the conveying tube; and a blocker opening in the blocker member;

the blocker member being movable to selectively block or open the tube opening, wherein overlap between the tube and blocker openings defines the discharge opening. Each blocker member may comprise a ring member circumscribing the conveying tube and being independently rotatable about the longitudinal axis thereof, rotation of the ring member bring­ing the blocker and tube openings in and out of alignment. Each ring member may have two ends releasably clamped together.

According to a second aspect of the invention there is provided an apparatus for discharging material at spaced intervals, said apparatus comprising:

a conveying tube supported to define a path along which material can travel;

a conveying mechanism to move material along the con­veying tube; and discharge elements spaced along the conveying tube, each discharge element comprising a discharge opening through which material can be discharged from said conveying tube, at least one discharge opening proximate a first end of the conveying tube being greater in elevation relative to said conveying tube than at least one discharge opening proximate a second end of said conveying tube opposite the first end.

According to a third aspect of the invention there is provided an apparatus for discharging material at spaced intervals, said apparatus comprising:

a conveying tube supported to extend substantially horizontally to define a path along which material can travel;

a conveying mechanism to move material along the conveying tube; and discharge elements spaced along the conveying tube, each discharge element comprising a discharge opening through which material can be discharged from said conveying tube, relative elevation between at least one discharge opening proximate a first end of the conveying tube and at least one discharge opening proximate a second end of the conveying tube opposite the first end being adjustable.

BRIEF DESCRIPTION OF THE DRAWINGS

In the accompanying drawings, which illustrate an exemplary embodiment of the present invention.

DETAILED DESCRIPTION

Figure 1:
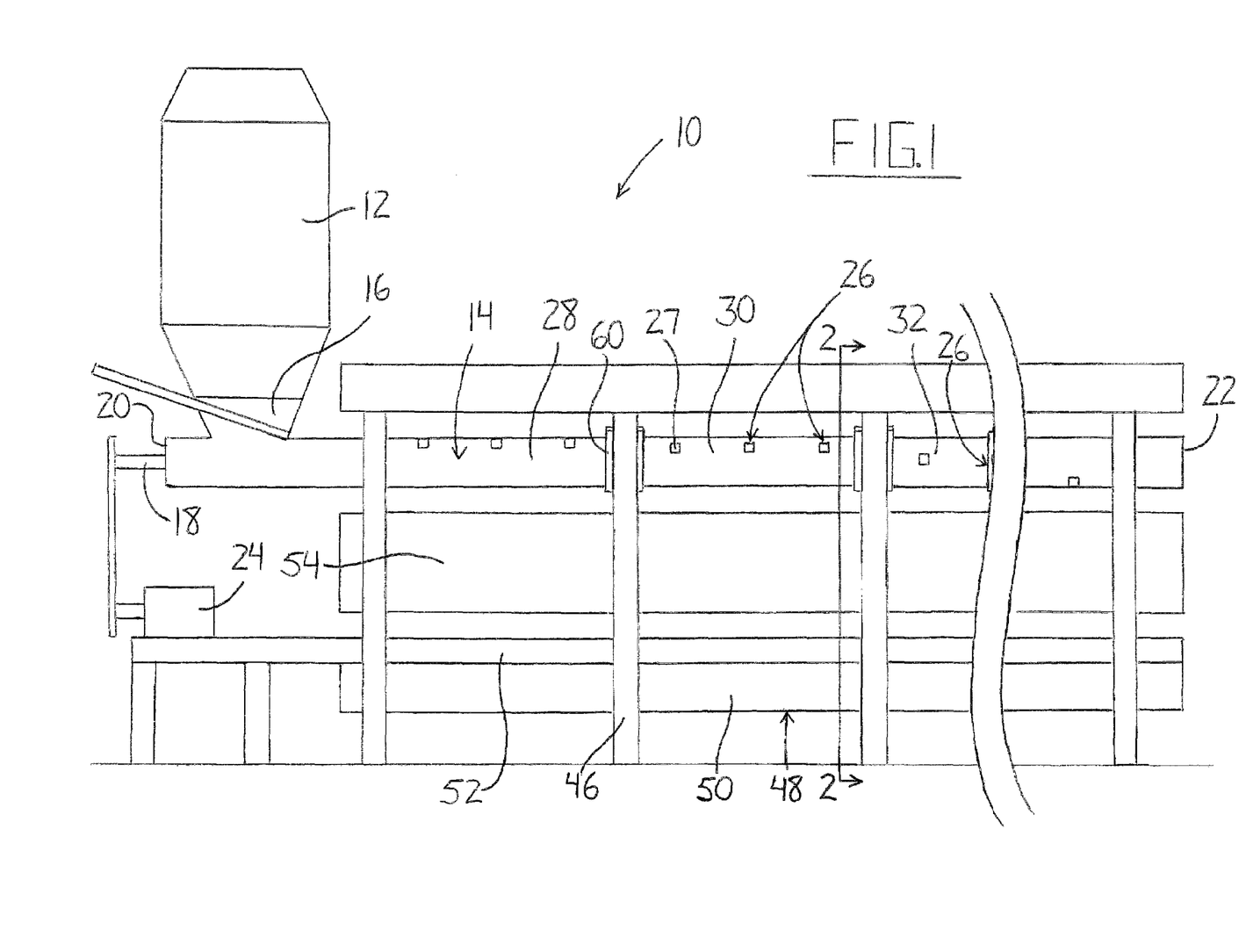
FIG. 1 is a side view of the apparatus for discharging material at spaced intervals.

FIG. 1 shows an apparatus 10 capable of discharging material substantially evenly at spaced intervals in a relatively quick fashion, for example, for use as a feeding system for livestock. Food material stored within a hopper 12 is gravity fed into a conveying tube 14 through a chute 16. An auger 18 is operably disposed in the conveying tube for use as a conveying mechanism for moving the material from a first end 20 of the tube near the hopper 12 to a second distal end 22. The auger 18 is operably connected to a drive source 24 for driven rotation thereby. Discharge elements 26, each featuring a discharge opening 27, are provided in a spaced manner along the conveying tube to facilitate the discharge of material therefrom. The discharge openings 27 are arranged in a descending manner along the length of the conveying tube 14 from the hopper 12. In other words, a discharge opening nearest the second end 22 of the conveying tube 14 is disposed lower thereon than a discharge opening nearest the first end of the tube.

Opening of the chute 16 quickly fills the first end 20 of the conveying tube with material, at which point the drive source 24 is activated to begin running the auger 18. It should be appreciated that the movement of material through an enclosed tube by an auger would result in an initial sloped distribution of material within the tube that decreases from the filled first end toward the second end gradually being filled by the introduction of material thereto by the auger. Continued feeding of material into the tube would increase the height of the material over the length of the tube. The relatively high positioning of discharge openings 27 near the first end 20 means that during the initial stages of moving material toward the second end 22, the material will simply pass beneath the openings and thus remain inside the tube 14. As more material is conveyed from the hopper 12, the height of material at the discharge opening nearest the first end 20 will increase to the point that material will pass through the relatively high discharge opening near the top of the tube. In the meantime, the conveyed material will be approaching the second end 22. The delay of discharge from the openings near the first end, due to their increased elevation, reduces lag time between discharge at the opposite ends.

As seen in FIG. 1, the decrease in elevation of the discharge openings 27 along the conveying tube 14 is staggered. The conveying tube 14 is divided into sections, each of which has its discharge openings 27 disposed at a common height on the tube. In order to facilitate elevation adjustment of the discharge openings 27 of a particular section, each section is supported for independent rotation about a longitudinal axis of the tube. Rotation of a cylindrical section changes the height of the discharge openings that are circumferentially fixed thereon. For example, consider the first section 28, second section 30 and third section 32 as shown in FIG. 1. The second section 30 is supported for rotation relative to the first and third portions connected to its opposite ends. As a result, the three discharge openings pictured in the second section 30 can be raised or lowered through rotation of the cylindrical section. This height adjustability of the discharge openings 27 along the conveying tube allows fine tuning of the system to better reduce lag time between discharge by progressive discharge elements, thereby encouraging more even distribution of material along the tube.

Figure 3:
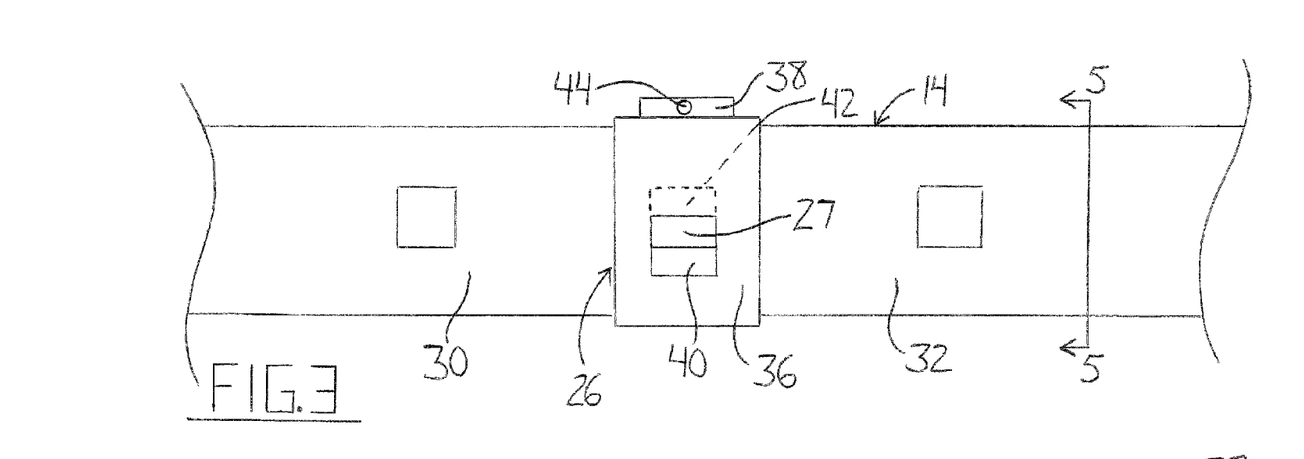
FIG. 3 is a side view of a third section of the conveying tube of the apparatus of FIG. 1 illustrating a reduction in size of a discharge opening by a blocker member.

FIG. 3 shows a discharge element 26 featuring a blocker member 36 that is movable to either block or open the respective discharge opening 26 in the conveying tube 14. In other words, the blocker member 36 can be used to turn a discharge element on or off as desired to control the distribution of material discharged from the conveying tube 14. The illustrated blocker member 36 is a strip that is curved to form a pipe clamp having mating flanges 38 at opposite ends thereof. The blocker member is fitted about the conveying tube 14 and has a blocker opening 40 in the strip that can be aligned with a respective tube opening 42 in the tube by rotation of the blocker member about the longitudinal axis of the tube. A tightenable fastener 44, such as a nut and bolt assembly, connects the flanges 38 such that tightening of the fastener urges the pipe clamp closed to tighten the blocker member 36 about the tube 14 and thus fix its position thereon.

Figure 4:
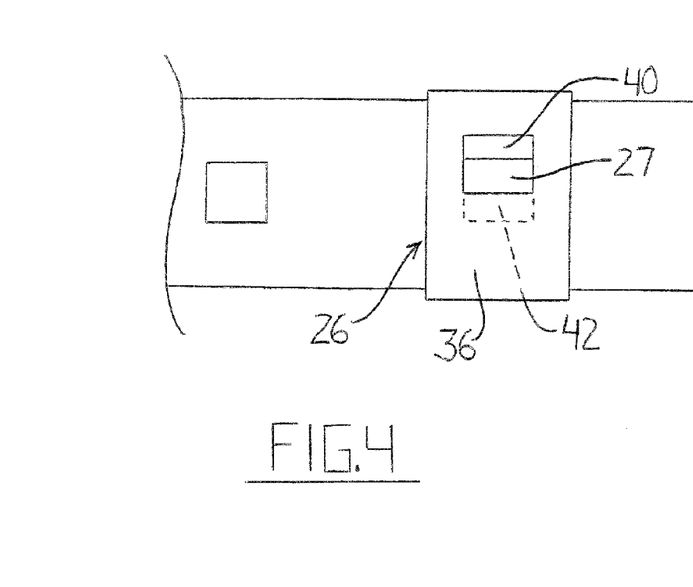
FIG. 4 is a side view of the third section of FIG. 3 illustrating a reduction in size and increase in elevation of the discharge opening by the blocker member.
Figure 5:
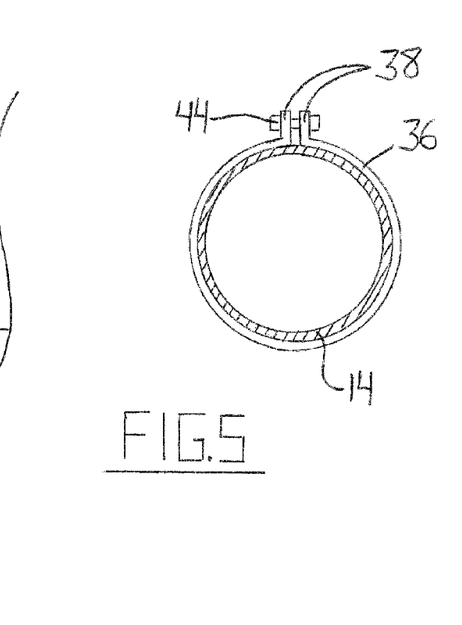
FIG. 5 is a cross sectional view of the third section as taken along line 5-5 of FIG. 3.

In addition to being rotatable to either completely block or open the tube opening 42, the blocker member 36 can also be positioned to restrict the size of an opening through which material can pass from inside the tube 14. In other words, the size of the discharge opening 27 of a discharge element including a blocker member is defined by overlap of the tube opening 42 and blocker opening 40. FIGS. 3 and 4 each show a discharge opening 27 that has been reduced to approximately half the size of adjacent openings. FIG. 4 also shows how the blocking member 36 can act to increase the elevation of a discharge opening 27 by blocking off a bottom portion of the tube opening 42.

While shown as being of substantially equal size, the tube opening 42 and blocker opening 40 may be of different sizes. For example, looking at FIG. 4, it should be appreciated that if the tube opening 42 was approximately 1.5 times taller, then the illustrated position of the blocking member 36 could provide the same increase in elevation of the discharge opening 27 without decreasing its size. Alternatively, a number of circumferentially spaced tube openings could be provided to give the user more control over the positioning of the discharge opening on the tube through alignment of the blocker opening 40 with a selected one of the tube openings. Blocker members may be provided on each, or just selected ones of the discharge openings 27 spaced along the conveying tube. The purpose of the blocker member 36 is to provide a higher level of control over the discharge of material from the conveying tube 14 through adjustment of the size and/or elevation of the discharge openings 27. It should be appreciated that for discharge elements not equipped with blocker members, the discharge opening and tube opening are one in the same. In other words, in such a discharge element, the discharge opening is simply an opening provided in the tube.

The individually rotatable tube sections 28, 30 and 32 and the use of at least one blocker member 36 allows a user to control the distribution of material along the length of the apparatus 10, for example to distribute a substantially equal amount at each discharge element. For example, upon setting up and running the apparatus, if it is found that of two adjacent tube sections, one is discharging material a significant amount of time before another, then independent rotation of the one section will vertically reposition the discharge openings therein and thus alter the time it takes for material to pile up within the section to reach the point of exit from the tube. Once this adjustment has been performed and the lag time between initial discharge from the separate sections is minimized, the elevation and/or size of individual discharge openings can be adjusted through the application or repositioning of blocker members. Such fine tuning allows a user to ensure that an equal portion of material is distributed by each discharging element when running the apparatus for a set period of time.

Figure 2:
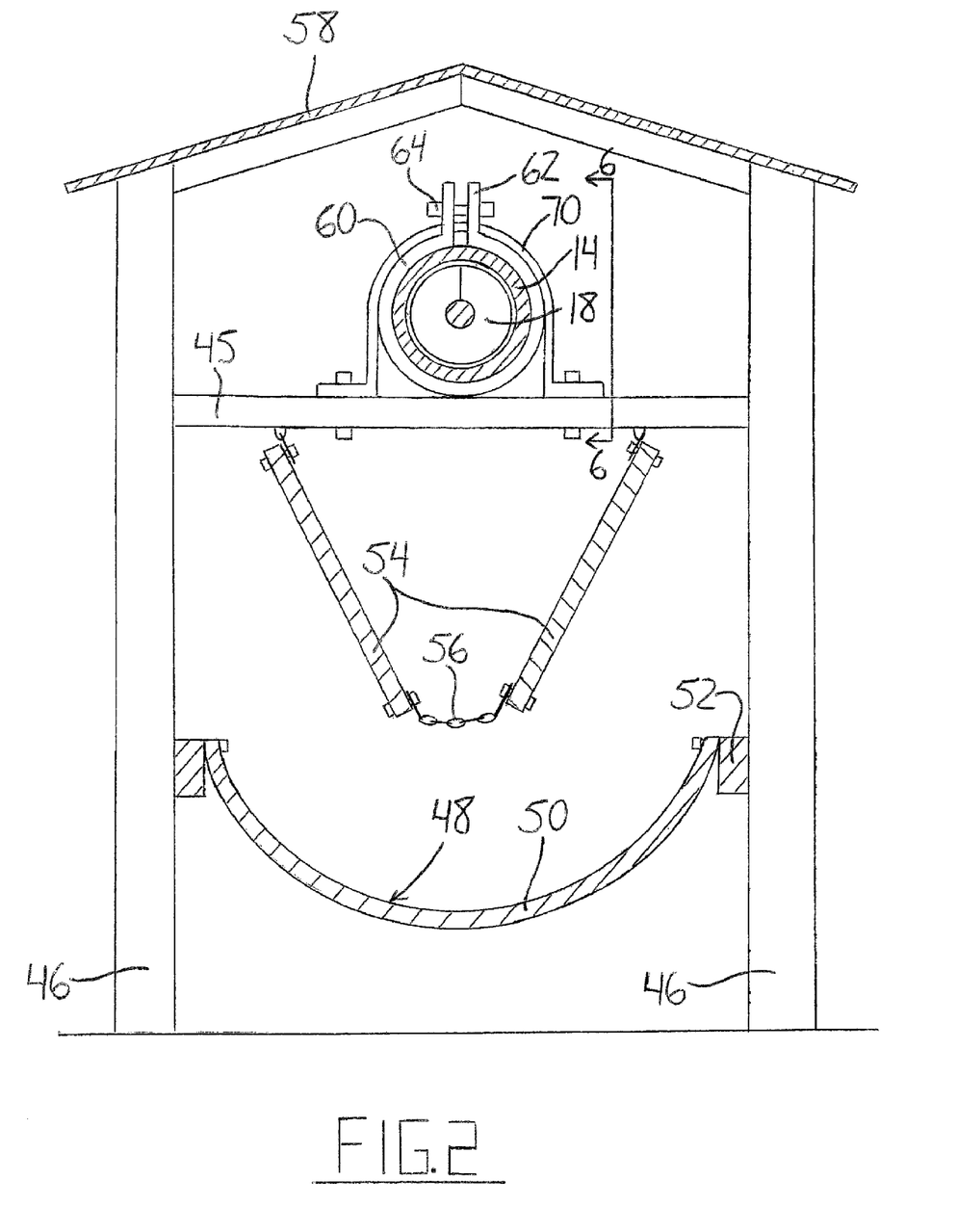
FIG. 2 is a cross sectional view of the apparatus as taken along line 2-2 of FIG. 1.

FIG. 2 shows a cross section of the apparatus 10. The conveying tube 14 is supported atop cross members extending transverse thereto between vertical support posts 46 disposed on opposite sides of the tube at spaced intervals therealong. A flexible trough 48 is defined by belts 50 that are hung on either side of the conveying tube 14 from support members 52 mounted to the vertical support posts 46 to extend along the tube therebelow. Food material discharged from the conveying tube 14 falls to the trough 48 for consumption by animals therefrom. Baffles 54 hang from the cross members 45 on opposite sides of the conveying tube and converge downward therefrom to guide the material toward the transverse center of the apparatus 10 to ensure that material ends up in the trough 48. A portion of the trough beneath a respective discharge element defines a feeding station in the exemplary use of the apparatus for feeding livestock. The baffles 54 are connected at intervals along the apparatus by connection members 56, such as chains, to maintain their converging arrangement. In cases where the apparatus is installed outdoors, the baffles reduce the effect of wind on the falling material. A roof assembly 58 extending from the hopper 12 to the second end of the conveying tube 14 is supported on the vertical support posts 46 to protect the majority of the apparatus from the elements, such as rain, snow and hail.

While the baffles help to direct the discharge of material from a discharge element to a respective feeding station below, it should be appreciated that the flow of material from the conveying tube to the feeding station is substantially unrestricted as the material free falls from the discharge openings. This differs from the prior art wherein the material is delivered from the conveying tube to feeding stations by drop tubes that restrict material exiting the tube and require filling before material can flow further along the conveying tube to succeeding drop tubes.

Figure 6:
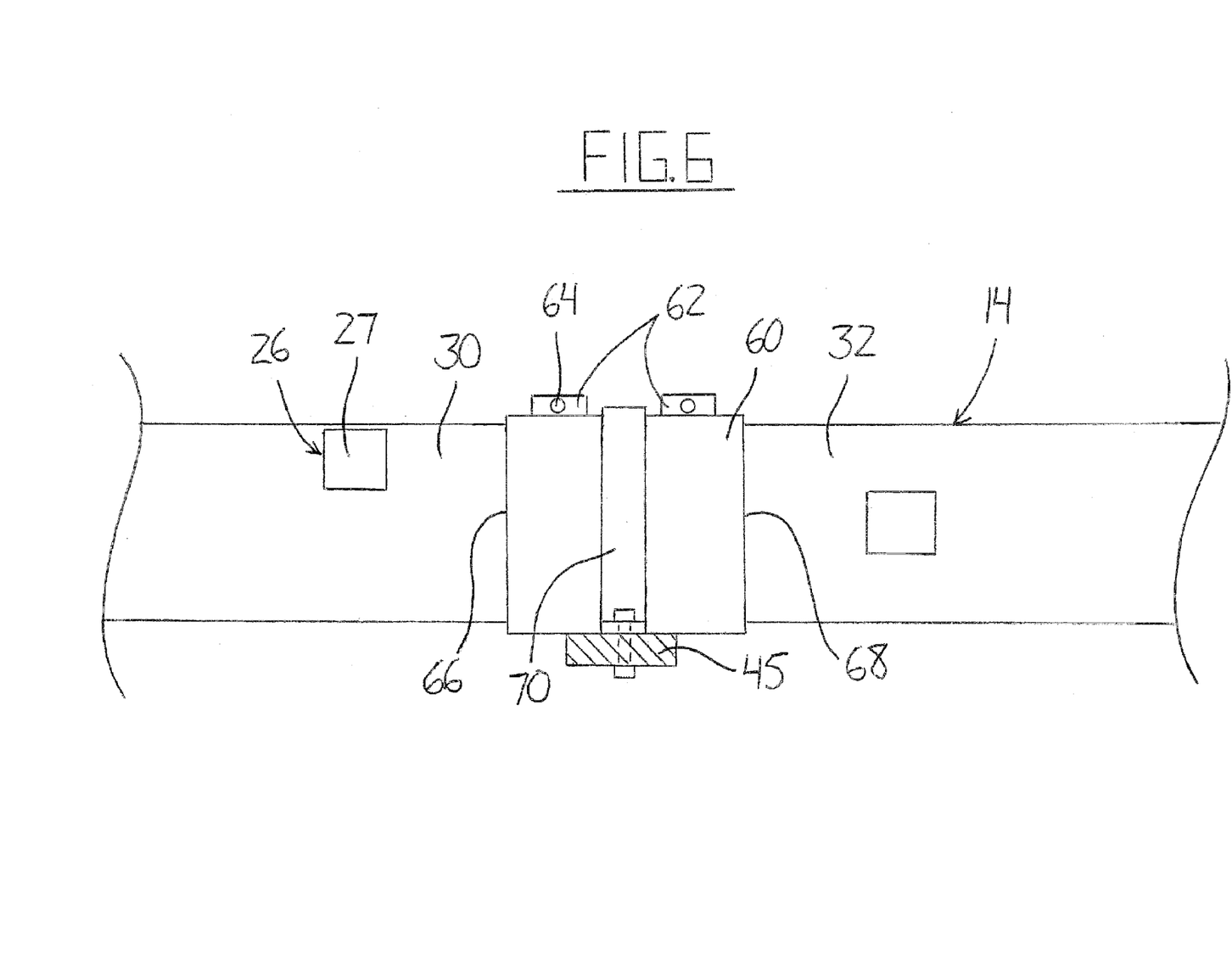
FIG. 6 is a side view of a junction between second and third sections of the conveying tube as taken along line 6-6 of FIG. 2.

FIG. 6 shows the juncture between the second and third sections 30, 32 of the conveying tube 14. Similar to the blocker member 36, the connection member 60 is shown having the form of a pipe clamp sized to fit about the conveying tube and having mating flanges 62 disposed at opposite ends which are connected together by tightenable fasteners 64. With the fasteners 64 in a loosened state, the ends of the two sections 30, 32 received in opposite ends 66, 68 of the connection member 60 are each free to rotate relative thereto along the longitudinal axis of the conveying tube 14. Once a desirable elevation of the discharge openings 27 of a section has been achieved through such rotation, tightening of the fasteners 64 at each end of the section clamps the connection member tight around the section to fix its orientation. Mating flanges 62 are provided adjacent each end 66, 68 of the connection member 60 to ensure a stable and separate fit to each section received therein. This allows rotation of one tube section while the other remains fixed.

The connection members 60 are mounted to cross members 45 by retaining members 70, each having the form of a strap or clamp that extends over the connection member 60 and is fastened at opposite ends to the cross member. This arrangement supports the conveying tube 14 by fixing the connection members 60 to the cross members 45 while leaving the tube sections free to rotate relative to one another.

It should be appreciated that the apparatus may be constructed to be of have different overall lengths, number of discharge elements, number of rotatable sections, number of discharge elements per section and number of blocker members. Since multiple design factors, for example the conveying tube length and diameter and the auger speed, will affect the rate of material buildup in the conveying tube, the ideal height distribution of the discharge openings over the length of the apparatus will vary depending on the details of a particular application of the present invention. The apparatus may be sold in a pre-engineered format where the heights of the discharge openings are fixed based on selected design parameters to optimize the distribution of material discharged from the conveying tube. In such a case, the conveying tube could be a continuous piece without the independently rotatable sections described in the detailed embodiment and block members may or may not be provided to offer fine tuning of the apparatus. It is providing the decreasing elevation of the discharge openings, relative to the conveying tube, that minimizes lag time between discharge elements and encourages even distribution. Providing adjustment of the discharge opening elevations, either on an individual or grouped basis, allows fine tuning to optimize material distribution over the length of the apparatus to fit the requirements of different applications.

A prototype of the apparatus has been constructed for use as a cattle feeding system in which the conveying tube is formed by five twenty-foot sections of seven-inch diameter pipe. Each section contains ten discharge openings spaced two feet apart and each measuring 2 inches square. The baffles are formed by suspended plywood sheets, the roof is made of tin and is peaked to encourage runoff and the trough is of the construction described above. A 220-volt, 7 horsepower electric motor and a two-gear step-down assembly are operably connected by chains to form the drive source for the auger. The chute between the hopper and conveying tube is adjustable to control the entry of material into the tube. The hopper is fed from a larger material storage device by another auger driven by another 220-volt, 7 horsepower electric motor in a conventional fashion known to those of skill in the art. On/off and control switches and an electrical breaker box are provided for control of the two augers by a user, along with a timer for running the conveying tube auger for a set period of time. It should be appreciated that the details of this prototype are presented in an exemplary context in regard to the present invention, and should not be used to limit the scope of the present application.

Figure 7:
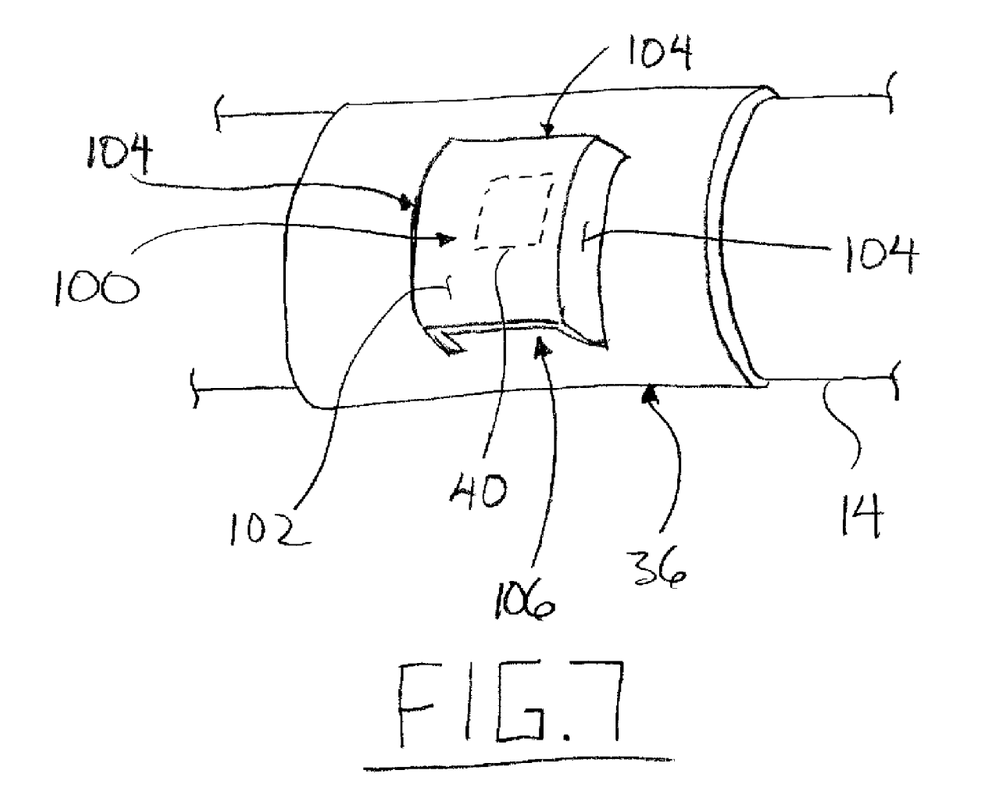
FIG. 7 is a perspective view of a further embodiment of the blocker member of FIG. 3 in which a protective cover is provided on the blocker member.

In a further embodiment as illustrated in FIG. 7, the blocker member 36 comprises a sleeve rotatable about the auger tube 14 as in the previous embodiment. The blocker member 36 in FIG. 7 is distinguished from previous embodiments however, in that a cover 100 is provided which restricts access to the blocker opening 40 in the sleeve portion of the blocker member 36. More particularly, the cover 100 comprises a guard plate 102 which is curved at least partway about the blocker member 36, so as to overlap the opening 40, while being spaced radially outward therefrom. A gap is thus defined between the sleeve of the blocker member 36 and the guard plate. Side walls 104 span between the guard plate 102 and the blocker member 36 along both sides and along the top of the guard plate so that the area between the guard plate 102 and the blocker member is only open along the bottom end 106 thereof. The material which normally exits from the opening 40 thus freely falls through the open bottom end 106 of the cover 100, but the cover restricts access to anyone attempting to insert anything, accidental or otherwise, into the opening 40 from the exterior of the tube 14. Accordingly, the cover is a safety measure to protect objects being inserted through the opening 40 and cut off by operation of the auger rotating in the tube 14.

In yet further embodiments the cover may instead take the form of a grill or other suitable member which prevents objects being inserted into the discharge opening 40 but prevents access of larger objects into the tube 14 through the opening 40.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An apparatus for discharging material at spaced intervals, said apparatus comprising:
    a supply of material to be discharged;
    a conveying tube extending between a first end connected to the supply of material and a second end spaced from the first end, the conveying tube being supported to define a substantially horizontal path along which material can travel;
    a trough extending below the conveying tube;
    a conveying mechanism arranged to move material along the conveying tube from the supply at the first end of the conveying tube to the second end of the conveying tube; and
    a plurality of discharge elements at spaced apart positions along the conveying tube between the first and second ends of the conveying tube, each discharge element comprising a discharge opening positioned on the conveying tube so as to be arranged to discharge the material in the conveying tube therethrough from the conveying tube to the trough below the conveying tube at the spaced apart positions along the conveying tube;
    the conveying tube comprising a plurality of longitudinal sections connected inline with one another, each longitudinal section having a plurality of the discharge elements therein;
    the longitudinal sections of the conveying tube being independently rotatable relative to one another about a longitudinal axis of the conveying tube such that at least some of the discharge openings are adjustable in elevation relative to other ones of the discharge openings;
    at least one discharge element of each section of the conveying tube further comprising: a movable blocker member supported on the conveying tube; a tube opening in the conveying tube; and a blocker opening in the blocker member; wherein the blocker member is movable to selectively block or open the tube opening and wherein overlap between the tube opening and the blocker opening defines the discharge opening;
    the discharge openings of the discharge elements being arranged to be located in a descending configuration in relative elevation along the conveying tube from the first end of the conveying tube to the second end of the conveying tube such that the discharge opening nearest the first end of the conveying tube is greater in elevation relative to said conveying tube than the discharge opening nearest to the second end of said conveying tube opposite the first end.

2. The apparatus according to claim 1 wherein the conveyer tube is cylindrical and the conveying mechanism comprises an auger operably disposed within said conveyer tube.

3. The apparatus according to claim 1 wherein each blocker member comprises a ring member circumscribing the conveying tube and being independently rotatable about the longitudinal axis thereof, rotation of the ring member bringing the blocker and tube openings in and out of alignment.

4. The apparatus according to claim 3 wherein each ring member has two ends releasably clamped together.

5. A method for discharging material at spaced intervals, said method comprising the steps of:
    providing a supply of material to be discharged;
    supporting an elongate conveying tube to extend between a first end connected to the supply of material and a second end spaced from the first end to define a path along which the material can travel;
    providing discharge elements spaced along the conveying tube, each discharge element comprising a discharge opening such that the material is arranged to be discharged from said conveying tube through the discharge openings;
    forming the conveying tube to comprise longitudinal sections connected inline and supported so as to be independently rotatable relative to one another about a longitudinal axis of the conveying tube;
    locating a plurality of the discharge elements in each longitudinal section of the conveying tube;
    providing at least one discharge element of each longitudinal section of the conveying tube with a movable blocker member supported on the conveying tube; a tube opening in the conveying tube; and a blocker opening in the blocker member; wherein the blocker member is movable to selectively block or open the tube opening and wherein overlap between the tube opening and the blocker opening defines the discharge opening;
    providing a trough extending below the conveying tube;
    operating a conveying mechanism in the conveying tube to move the material along the conveying tube from the supply of material at the first end towards the second end of the conveying tube so as to be discharged from the discharge openings into the trough; and discharging the material from the discharge openings evenly with one another to the trough below the conveying tube at spaced positions along the conveying tube by rotating the longitudinal sections of the conveying tube relative to one another and adjusting the movable blocker members so as to arrange the discharge openings in a descending configuration in relative elevation along the conveying tube from the first end of the conveying tube to the second end of the conveying tube such that the discharge opening nearest the first end of the conveying tube is greater in elevation relative to said conveying tube than the discharge opening nearest to the second end of said conveying tube.

6. The method according to claim 5 further comprising the step of adjusting the size of at least one discharge opening.

7. The method according to claim 5 further comprising the step of aligning the discharge elements with respective receiving stations disposed beneath the conveying tube so as to be arranged to receive the material discharged from the discharge elements respectively.

8. The method according to claim 5 wherein the conveyer tube is cylindrical and the conveying mechanism comprises an auger operably disposed within said conveyer tube.

* * * * *